Oct. 1, 1940.  J. M. LARSON  2,216,246

REGULATOR

Filed Dec. 23, 1937

INVENTOR
John M. Larson
BY
George H. Fisher
ATTORNEY

Patented Oct. 1, 1940

2,216,246

UNITED STATES PATENT OFFICE 2,216,246

REGULATOR

John M. Larson, Chicago, Ill., assignor to Minneapolis-Honeywell Regulator Company, Minneapolis, Minn., a corporation of Delaware Application December 23, 1937, Serial No. 181,351

7 Claims. (Cl. 236—9)

This invention relates in general to automatic controllers, and is more particularly concerned with automatic controllers adapted for controlling the draft dampers of a coal fired furnace, such as used for space heating.

It is an object of my invention to provide a simple, inexpensive, and compact damper regulator which is adapted to control the draft to the furnace in accordance with the temperature or pressure of the furnace or boiler, and in accordance with the condition of the space being heated. This result is attained by the provision of a boiler regulator having two condition responsive devices, one being responsive to the temperature or pressure of the boiler or furnace, and the other being a thermostatic device which is subjected to the influence of a heating element under the control of a space thermostat, this thermostatic device cooperating with the boiler condition responsive device for positioning the draft damper or other heat regulating device.

Another object of my invention is the provision of a device of this general character with a simple and inexpensive arrangement for maintaining the boiler responsive device and the heating element influenced thermostat in alignment, while at the same time permitting easy assembling of the device.

A further object of this invention is the provision of a heating element influenced thermostat arrangement which is adapted to be moved bodily by the boiler condition responsive device without varying the distance between the heating element and the thermostat influenced thereby.

Another object is the provision of an improved form of heating element influenced thermostat or heat motor which is simple and inexpensive in construction and which quickly responds to variations in energization of the heating element.

A still further object of my invention is the provision of a device of this character which is adapted to remain energized for long periods of time without injury or undue stressing of the thermostat.

Other objects will appear from the following description and the appended claims.

For a full disclosure of this invention, reference is made to the following detailed description and to the accompanying drawing, in which Figure 1 is an elevation partly in section of my improved controller.

Figure 1:
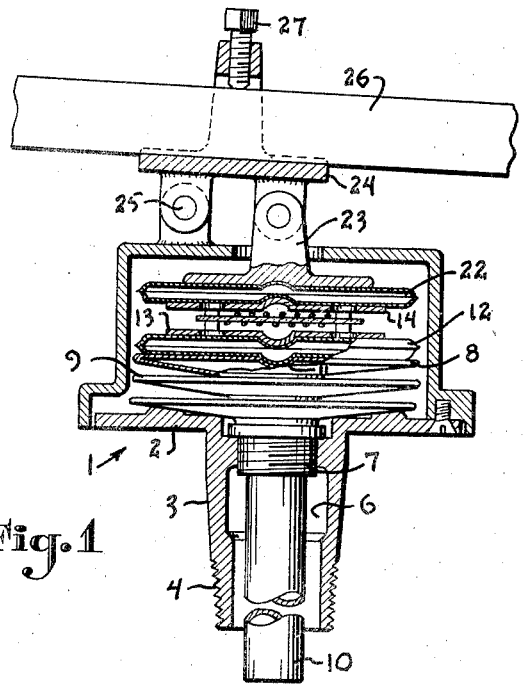
Figure 2:
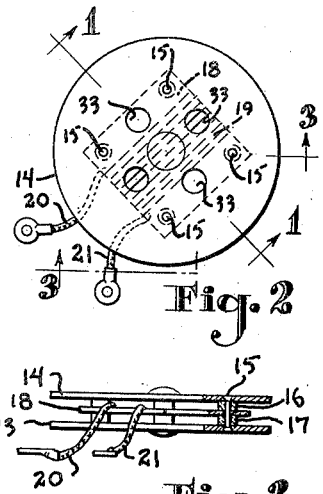
Figure 2 is a plan view of the spacer device.
Figure 3:
Figure 3 is an elevation partly in section of the spacer device, this view being taken on lines 3—3 of Figure 2.

Referring to Figure 1, reference character 1 indicates a base member having a horizontal portion 2 and a cylindrical depending portion 3, the lower end of the latter portion being threaded at 4 to be received in a suitable opening in the top of the boiler 5. The cylindrical portion 3 is hollow, providing an opening 6. This opening is reduced in size at the upper end of portion 3 for the reception of a threaded nipple 7 which supports a diaphragm structure 8, this diaphragm structure comprising a plurality of superposed and attached diaphragms or cells 9. The lowermost diaphragm 9 is attached to a tube 10 which extends through the nipple 7 and the opening 6 into the water space of the boiler 5. The diaphragms 9 are connected together in a fluid tight manner and the lowermost diaphragm is sealed to the tube 10 for forming a fluid tight structure. The tube 10 is charged with a suitable volatile fluid such as ether, and thus the pressure within the tube 10 and the diaphragm structure will vary in accordance with the temperature of the boiler water. As the boiler temperature increases, the vapor pressure of the volatile fill will increase and cause expansion of the diaphragms or cells 9. Upon decrease in boiler temperature, the opposite action will take place.

The uppermost diaphragm or cell 9 is depressed at its center to provide a concave portion as shown at 11. Mounted upon the uppermost cell 9 is a flat diaphragm element or cell 12 which is maintained in alignment on the upper cell 9 by means of a bulged or convex portion which coincides and inter-fits with the concave portion of said upper cell. The upper surface of the diaphragm element 12 is recessed to provide a concave portion and carries a circular plate 13 which has a bulged or convex portion interfitting with the concave portion of diaphragm element 12 for maintaining this plate in fixed relationship with said diaphragm element. The plate 13 forms a portion of a spacer within which is mounted a heating element. This spacer comprises a second plate 14 which is similar to the plate 13, these plates being secured together by means of rivets 15 and are spaced apart by means of spacing washers 16 and 17 which surround the rivets. Between the spacing washers 16 and 17 is mounted a rectangular piece of mica 18 which forms a base for a heating element. Around the base 18 is wound a coil 19 of suitable resistance material, this coil being provided with leads 20 and 21.

Figure 5:
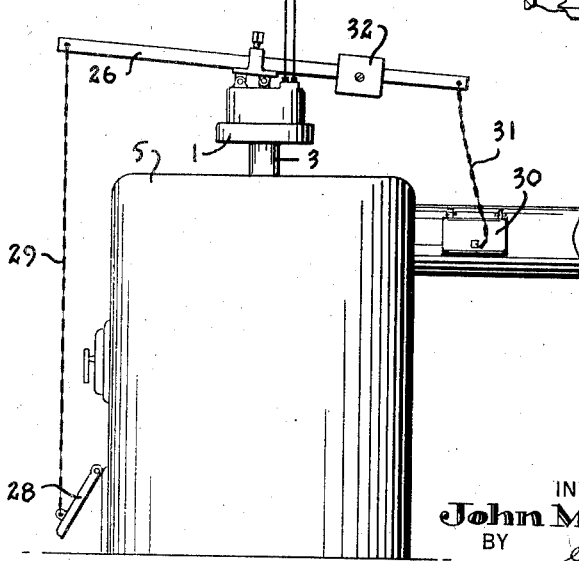
Figure 5 is a diagrammatic view showing one manner in which the controller may be applied to a boiler.

Upon the member 15 is mounted a diaphragm element or cell 22 which is similar in all respects to the diaphragm element 12. The element 22 is maintained in alignment with the member 14 by means of a convex portion in the member 14 which interfits with a concave portion in the lower wall of the diaphragm element 22. Mounted upon the upper face of the diaphragm element 22 is an actuating member 23 which is pivotally connected to a rocker arm 24, this lever being fulcrumed at 25. The rocker arm 24 is formed to receive a slidable damper actuating lever arm 26 which may be held in fixed relationship with the rocker arm 24 by means of a set screw 27. As shown in Figure 5, the left-hand end of the arm 26 may be connected to the draft damper 28 of the boiler 5 by means of a chain 29, while the right-hand end of the lever 26 may be connected to actuate the check damper 30 by means of a chain 31. The bar 26 may also be provided with a slidable weight 32 which biases the diaphragm structure 8, and the diaphragm structure formed of diaphragm elements 12 and 22 towards contracted position thereby biasing the draft damper 28 towards open position.

From the foregoing it will be apparent that the diaphragm elements 12 and 22 are subjected to the influence of the heating element 19. These diaphragm elements are each charged with a small amount of volatile fluid for thereby causing them to expand when the heating element 19 is energized. In order to quicken the response of the elements 12 and 22 to energization of the heating element 19, the plates 13 and 14 may be provided with holes as shown at 33, for thereby allowing heat to radiate directly from the heating element to the faces of these diaphragm elements. The charge of volatile fluid inserted within the diaphragm elements 12 and 22 is preferably limited so that all of the volatile substance will be evaporated before such a pressure is built up within these diaphragm elements as to cause overstressing or rupture thereof. By this arrangement, the heating element 19 may be energized for long periods of time without causing straining of the diaphragm elements.

Figure 4:
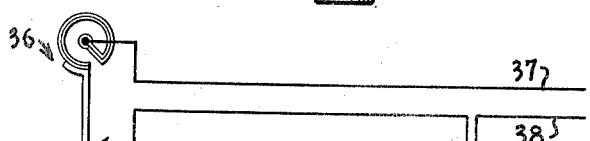
Figure 4 is a fragmentary view showing the binding post arrangement.
Figure 4:
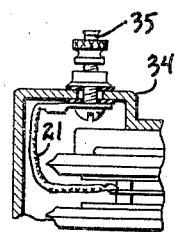

As shown in Figure 4, the upper portion of the housing for the controller may be bulged at 34 to provide space for binding posts such as 35, to which the heating element leads 20 and 21 may be attached. These binding posts in turn may be connected in series (as shown in Figure 5) with a room thermostat 36 to a source of power indicated by line wires 37 and 38. This room thermostat 36 is arranged so as to close the circuit through the heating element 19 when the room temperature is satisfied, while opening the circuit and deenergizing the heating element when heat is required.

When the room temperature is below the setting of the thermostat 36 the heating element 19 will be deenergized as described above, and consequently the diaphragm elements 12 and 22 will be collapsed due to the action of the weight 32, this permitting opening of the draft damper 28 and closing of the check damper 30 for thereby increasing the rate of combustion. At this time, control of the dampers 28 and 30 will be left entirely to the boiler temperature thermostat formed of the tube 10 and the diaphragm structure 8. If the boiler temperature is below a predetermined value the diaphragm structure 8 will be collapsed sufficiently to permit opening of damper 28 and closing of the damper 30 for increasing the rate of combustion. This will result in the boiler temperature rising. As the boiler temperature rises to a point determined by the position of the weight 32 on the lever arm 26, the diaphragm structure 8 will begin expanding, thereby acting to close the draft damper 28 and open the check damper 30 for diminishing the rate of combustion. In this manner the boiler temperature responsive thermostat will control the dampers 28 and 30 in a manner to maintain a predetermined boiler temperature.

When the room temperature becomes satisfied, the thermostat 36 will energize the heating element 19. This will heat up the diaphragm elements 12 and 22, thereby causing these elements to expand. Expansion of these elements will cause counter-clockwise rotation of the lever arm 26 against the action of the weight 32 for closing the draft damper 28 and the check damper 30. In this manner, when the room temperature is satisfied, the rate of combustion within the boiler 5 will be diminished even though the boiler temperature may be below the setting of the boiler thermostat as determined by the position of the weight 32 on arm 26.

From the foregoing, it will be seen that the arrangement described will place the boiler thermostat in full control of the dampers when heat is required within the heated space, the boiler thermostat at this time acting to maintain a predetermined boiler temperature for thereby insuring delivery of heat to the space while at the same time preventing overheating of the boiler. When the space temperature is satisfied, however, the rate of combustion will be diminished due to the expansion of the diaphragm elements 12 and 22.

Due to the flat shape of the diaphragm elements 12 and 22, their surface area is very large as compared with their volumetric capacity. This large surface area provides for quick response to the influence of the heating element 19 and also provides for quick cooling of these diaphragm elements when the heating element 19 is deenergized. Also, due to the flat shape of elements 12 and 22, they may expand and contract to a considerable extent without damage, as the flexing takes place over a relatively large area. This provides for a relatively large range of movement, while at the same time forming a very compact arrangement. It should be noted that with the described construction of the diaphragm structure or heat motor formed of the diaphragm elements 12 and 22, and the heating element 19, this structure may rise and fall with movements of the diaphragm structure 8 without disturbing the relationship between the heating element and the diaphragm elements 12 and 22. In other words, with this construction the heating element is always adjacent the diaphragm elements 12 and 22, and consequently can be made much smaller than if the heating element were made stationary.

From the foregoing, it should be apparent that my improved damper regulator is simple, and inexpensive in construction, and is quickly responsive to the command of the room thermostat due to the improved form of heat motor utilized. It should also be apparent that this improved form of heat motor remains in alignment with the other parts of the regulator, and moves as a unit, thereby maintaining the heating element in the most efficient relationship with the diaphragm elements and permitting the use of a relatively small heating element which not only reduces the initial cost of the controller, but also reduces the power consumption thereof. Also, this heat motor is compact in construction providing a large movement for its size, and is immune to damage from excessive internal pressure.

While I have shown and described a preferred embodiment of my invention, it will be apparent that many changes which are within the scope of my invention will occur to those skilled in the art. It will also be apparent that while I have shown a specific arrangement in which my improved form of heat motor may be associated with the other elements of a damper regulator, the heat motor may be arranged in other manners, and in fact is not limited in its application to damper regulators. I therefore desire to be limited only by the scope of the appended claims.

I claim as my invention:

1. In a regulator for a heater having a controller for varying the operation thereof, means responsive to the condition of the heater for operating the controller in a manner to maintain the temperature of the heater substantially constant, a first flat expansible and contractible diaphragm element containing a volatile substance, a second expansible and contractible flat diaphragm element containing a volatile substance, said diaphragm elements being in juxtaposed relationship, a flat surface of one diaphragm element facing a flat surface of the other diaphragm element, said diaphragm elements being associated with the heater condition responsive means in a manner to vary the adjustment thereof for thereby varying the heater temperature maintained upon expansion and contraction of said diaphragm elements, a spacer between said diaphragm elements, said spacer comprising a flat member of heat resisting electric insulating material, an electrical heating element supported by said spacer for heating said diaphragm elements, and means for passing an electric current through said heating element.

2. In a regulator for a heater having a controller for varying the operation thereof, means responsive to the condition of the heater for operating the controller in a manner to maintain the temperature of the heater substantially constant, a first flat expansible and contractible diaphragm element containing a volatile substance, a second expansible and contractible flat diaphragm element containing a volatile substance, said diaphragm elements being in juxtaposed relationship, a flat surface of one diaphragm element facing a flat surface of the other diaphragm element, said diaphragm elements being associated with the heater condition responsive means in a manner to vary the adjustment thereof for thereby varying the heater temperature maintained upon expansion and contraction of said diaphragm elements, a spacer between said diaphragm elements, said spacer comprising a flat member of heat resisting electric insulating material, an electrical heating element supported by said spacer for heating said diaphragm elements, means for passing an electric current through said heating element, the amount of volatile substance in said diaphragm elements being limited so that all of said substance becomes evaporated when said diaphragm elements expand a predetermined amount, thereby limiting the total expansion of said diaphragm elements to a predetermined amount and permitting said heating element to be energized over prolonged periods without danger of rupture of said diaphragm elements.

3. In a regulator for a heater, in combination, a controller for varying the operation of the heater, an expansible and contractible diaphragm structure, means for varying the pressure exerted upon said diaphragm structure in accordance with the condition of the heater, a first relatively flat expansible and contractible diaphragm element mounted upon said diaphragm structure, means comprising coinciding interfitting surface irregularities in said diaphragm structure and said diaphragm element for maintaining said diaphragm element in alignment with the diaphragm structure, a second relatively flat diaphragm element, a spacer interposed between said first and second diaphragm elements, said spacer having surface irregularities interfitting with surface irregularities in said diaphragm elements for maintaining said diaphragm elements in alignment, a heating element mounted in said spacer adapted when energized to cause expansion of said diaphragm elements, and means actuated by said second diaphragm element for actuating said heater controller.

4. In a regulator for a heater, in combination, a controller for varying the operation of the heater, an expansible and contractible diaphragm structure, means for varying the pressure exerted upon said diaphragm structure in accordance with the condition of the heater, a first relatively flat expansible and contractible diaphragm element, a second relatively flat diaphragm element, a spacer interposed between said first and second diaphragm elements, said spacer having surface irregularities interfitting with surface irregularities in said diaphragm elements for maintaining said diaphragm elements in alignment, a heating element mounted in said spacer adapted when energized to cause expansion of said diaphragm elements, and means influenced by said diaphragm structure and said diaphragm elements for actuating said heater controller.

5. In a device of the character described, in combination, a controller, an expansible and contractible diaphragm structure for actuating said controller, said diaphragm structure comprising a pair of relatively flat diaphragm elements, each diaphragm element containing a volatile substance for causing it to expand and contract upon change in temperature, said diaphragm elements being in juxtaposed relationship, a flat surface of one diaphragm element facing a flat surface of the other diaphragm element, a spacing device between said diaphragm elements for maintaining said diaphragm elements in spaced relationship, said spacing device comprising a pair of plates engaging the opposed flat surfaces of said diaphragm elements, spacers between said plates, a flat member of heat resisting electric insulating material carried by said spacers, and an electric heating element supported by said flat member.

6. In a device of the character described, in combination, a controller, an expansible and contractible diaphragm structure for actuating said controller, said diaphragm structure comprising a pair of relatively flat diaphragm elements, each diaphragm element containing a volatile substance for causing it to expand and contract upon change in temperature, said diaphragm elements being in juxtaposed relationship, a flat surface of one diaphragm element facing a flat surface of the other diaphragm element, a spacing device between said diaphragm elements for maintaining said diaphragm elements in spaced relationship, said spacing device comprising a pair of plates engaging the opposed flat surfaces of said diaphragm elements, spacers between said plates, a flat member of heat resisting electric insulating material carried by said spacers, an electric heating element supported by said flat member, the amount of volatile substance in said diaphragm elements being limited so that all of said substance becomes evaporated when said diaphragm elements expand a predetermined amount, thereby limiting the total expansion of said diaphragm elements to a predetermined amount and permitting said heating element to be energized over prolonged periods without danger of rupture of said diaphragm elements.

7. In a regulator for a heater, in combination, a controller for varying the operation of the heater, an expansible and contractible diaphragm structure, means for varying the pressure exerted upon said diaphragm structure in accordance with the condition of the heater, a housing surrounding said diaphragm structure, a flat diaphragm element within said housing and associated with said diaphragm structure, said diaphragm structure and said diaphragm element acting conjointly to position said controller, said diaphragm element being spaced from said diaphragm structure, having a relatively large surface area for its volumetric capacity and containing a volatile substance, the amount of volatile substance contained being limited so that all of said substance becomes evaporated before an excessive pressure is built up within said diaphragm element thereby preventing rupture, a flat member of heat resisting electric insulating material located adjacent a flat surface of said diaphragm element, and an electric heating element supported by said flat member.

JOHN M. LARSON.